(12) United States Patent
Beckmann et al.

(10) Patent No.: US 9,834,947 B2
(45) Date of Patent: Dec. 5, 2017

(54) FIRE ESCAPE CHAMBER WITH OUTER CAGE AND INNER CAGE

(71) Applicant: Dräger Safety AG & Co. KGaA, Lübeck (DE)

(72) Inventors: Alexander Beckmann, Bad Schwartau (DE); Matthias Lühr, Lübeck (DE); Eric Rojahn, Lübeck (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 0 days.

(21) Appl. No.: 15/161,741

(22) Filed: May 23, 2016

(65) Prior Publication Data

US 2016/0348386 A1    Dec. 1, 2016

(30) Foreign Application Priority Data

May 29, 2015   (DE) .................. 10 2015 006 718

(51) Int. Cl.
| | |
|---|---|
| *E04H 9/14* | (2006.01) |
| *E04H 1/12* | (2006.01) |
| *F16K 17/02* | (2006.01) |
| *A62B 5/00* | (2006.01) |

(52) U.S. Cl.
CPC .............. *E04H 1/1261* (2013.01); *A62B 5/00* (2013.01); *F16K 17/02* (2013.01)

(58) Field of Classification Search
CPC   E04H 1/1261; E04H 9/14; E04H 9/16; E04B 1/94; E04B 1/34823; E05G 1/024; E05G 1/12; F27D 1/144
See application file for complete search history.

(56) References Cited

U.S. PATENT DOCUMENTS

| | | | | | |
|---|---|---|---|---|---|
| 5,210,985 | A | * | 5/1993 | Hsu ..................... | A62B 13/00 109/1 R |
| 5,259,758 | A | * | 11/1993 | Lauersdorf ............ | F27B 9/32 110/336 |
| 5,755,062 | A | * | 5/1998 | Slater .................... | E04H 9/04 52/265 |

(Continued)

FOREIGN PATENT DOCUMENTS

| | | |
|---|---|---|
| DE | 29 19 454 A1 | 11/1980 |
| DE | 37 18 911 A1 | 12/1988 |

*Primary Examiner* — Brian Glessner
*Assistant Examiner* — Daniel Kenny
(74) *Attorney, Agent, or Firm* — McGlew and Tuttle, P.C.

(57) ABSTRACT

A fire escape chamber includes a hermetically sealable outer cage with outer side wall elements, with an outer floor element and with an outer ceiling element. Fire protection insulation layers are provided on the inner sides of the outer elements with some fastened by pin elements, which protrude from the outer side wall elements and from the outer ceiling element into the respective fire protection insulation layers. An inner cage has inner side wall elements, an inner ceiling element and an inner floor element. The inner floor element is mounted in a supporting manner on the fire protection insulation layer of the outer floor element. The inner side wall elements and the inner ceiling element are formed by a plurality of support structure elements, on the inner sides of which panels are, in turn, fastened. The support structure elements are located at spaced locations from the pin elements.

20 Claims, 7 Drawing Sheets

(56) References Cited

U.S. PATENT DOCUMENTS

| | | | |
|---|---|---|---|
| 6,789,363 B1 * | 9/2004 | Frase | E04B 1/6116 |
| | | | 109/58 |
| 6,874,284 B1 | 4/2005 | Hayward | |
| 9,010,035 B1 * | 4/2015 | Guion | E04H 9/14 |
| | | | 52/169.6 |
| 9,469,986 B2 * | 10/2016 | Connell | E04H 1/1261 |
| 2003/0021924 A1 * | 1/2003 | Sakamoto | E05G 1/024 |
| | | | 428/35.2 |
| 2011/0083380 A1 * | 4/2011 | Thomas | E04B 1/94 |
| | | | 52/79.1 |
| 2013/0264131 A1 | 10/2013 | Carney | |

* cited by examiner

FIRE ESCAPE CHAMBER WITH OUTER CAGE AND INNER CAGE

CROSS REFERENCE TO RELATED APPLICATIONS

This application claims the benefit of priority under 35 U.S.C. §119 of German Application 10 2015 006 718.4 filed May 29, 2015 the entire contents of which are incorporated herein by reference.

FIELD OF THE INVENTION

The present invention relates to escape chambers for receiving escaping persons in the case of a fire in a working environment.

BACKGROUND OF THE INVENTION

Fire escape chambers for receiving escaping persons in the case of a fire in a working environment of the escaping persons are known. A fire escape chamber usually comprises a hermetically sealable outer cage and an inner cage, so that the escaping persons proceed to the fire escape chamber and can then hermetically seal this in order to protect themselves from combustion gases.

Further, fire escape chambers are known, which have the form of a container, so that such fire escape chambers can be transported and can thus be set up at preferred sites of a working environment.

SUMMARY OF THE INVENTION

An object of the present invention is to provide a fire escape chamber, which offers sufficient protection for escaping persons in case of a fire.

The fire escape chamber according to the present invention has a hermetically sealable outer cage with outer side wall elements, at least one outer floor element and at least one outer ceiling element, wherein respective fire protection insulation layers are provided on the respective inner sides of the outer elements. At least one part of the fire protection insulation layers is fastened by means of pin elements, which protrude into the respective fire protection insulation layers from the outer side wall elements and from the outer ceiling element.

The fire escape chamber according to the present invention has, further, an inner cage with inner side wall elements, at least one inner ceiling element and at least one inner floor element, wherein the inner floor element is mounted in a supporting manner on the fire protection insulation layer of the outer floor element. The inner side wall elements and the inner ceiling element are formed by means of a plurality of support structure elements, on the inner sides of which panels are, in turn, fastened, and that the support structure elements are located at spaced locations from the pin elements.

The outer cage is preferably configured as a container.

The fire escape chamber according to the present invention is advantageous, because a thermal coupling between the outer cage and the inner cage is minimized by the support structure elements and the pin elements used to fasten the insulation being located at spaced locations from one another. None of the support structure elements is in direct contact with one of the pin elements. The pin elements thus do not form a direct thermal bridge from the outer cage to the inner cage. Further, the fire escape chamber according to the present invention is advantageous because only the support structure elements come into contact with the fire protection insulation layers in the area of the side walls, but the entire inner side wall elements and the entire inner ceiling element do not, so that a thermal coupling between the outer cage and the inner cage is minimized thereby as well.

Another advantageous embodiment of the fire escape chamber according to the present invention is characterized in that the inner floor element has, at its outer edge, a bordering element, which extends around the outer edge in at least some segments and which is higher than the upper floor surface of the inner floor element and which is in contact with the fire protection insulation layers of the outer side walls, the inner side wall elements and the inner ceiling element being located at spaced locations from the respective fire protection insulation layers of the outer side wall elements and of the outer ceiling element. This is advantageous because slipping of the inner cage is minimized by the bordering element, which is in contact with the fire protection insulation layers of the outer side wall elements of the outer cage. The fire protection insulation layers usually consist of a highly compacted and mechanically stressable material, so that a certain mechanical stress by the inner bordering elements towards the fire protection insulation layers does not lead to a destruction of the fire protection insulation layers. Thus, in case the fire escape chamber is transported by construction equipment or a crane, slipping or motion of the inner cage within the outer cage can be prevented from occurring because the bordering element is in contact with the fire protection insulation layers of the outer side wall elements. Such transportation of the fire escape chamber by a crane is necessary, for example, especially when such a fire escape chamber shall be positioned at a certain site of an oil rig. The inner cage is in direct contact with the fire protection insulation layers of the outer elements of the outer cage only in the area of the lower surface of the inner floor element as well as of the bordering element. The fire escape chamber according to the present invention is therefore especially advantageous, because a thermal coupling between the outer cage and the inner cage is minimized by the inner side wall elements and the inner ceiling element being located at spaced locations from the respective fire protection insulation layers of the outer side wall elements and of the outer ceiling element.

Another advantageous embodiment of the fire escape chamber according to the present invention is characterized in that the support structure elements are fastened to the inner floor element such that these are located within an inner surface of the inner floor element, which said inner surface is limited by the bordering element, and are fastened with the upper surface of the inner floor element, and that the support structure elements are located at spaced locations from the respective fire protection insulation layers of the outer side wall elements and of the outer ceiling element. Due to the inner side wall elements and the inner ceiling element being formed by means of the support structure elements, a minimum stability of the inner cage is obtained and an excessive weight of the inner cage is avoided and the thermal coupling between the outer cage and the inner cage is also minimized.

Another advantageous embodiment of the fire escape chamber according to the present invention is characterized in that the support structure elements are hollow sections. This leads to modularity and flexibility of the configuration of the inner cage.

Another advantageous embodiment of the fire escape chamber according to the present invention is characterized in that the inner floor element has a tub-shaped configuration, and that the bordering element is, furthermore, a tub edge of the inner floor element. The tub-like configuration of the inner floor element makes it possible to manufacture the inner floor element in one piece together with the bordering element.

Another advantageous embodiment of the fire escape chamber according to the present invention is characterized in that an outer side wall element has a door frame for an outer door, that the door frame is formed from the outer side wall element towards an inner side wall element, and that the door frame is connected to the inner side wall element by a joint, which extends around the door frame and which is formed by a heat-insulating material. The advantageous connection of the door frame to the inner side wall element minimizes a thermal coupling between the door frame receiving the door and the inner cage.

Another advantageous embodiment of the fire escape chamber according to the present invention is characterized in that the inner cage has a lock area, which adjoins the inner side wall element and which can be hermetically separated from a main inner space of the inner cage by partition elements and by at least one additional lock door. The lock area makes it possible for an escaping person to enter the main inner space, and the entry of combustion gases and/or heat into the main inner space can be reduced by the use of the outer door and the lock door.

Another advantageous embodiment of the fire escape chamber according to the present invention is characterized in that the main inner space has an outside air valve and a control unit, the outside air valve controlling the inflow of outside air into the main inner space as a function of a control signal of the control unit. The outside air valve makes it possible to bring the main inner space to a minimum pressure with the use of outside air with such an air, which can be used as breathing air for escaping persons in a normal case, unlike in case of fire. Due to the control unit being able to actuate the outside air valve, it can be ensured that only outside air of a composition suitable for breathing by humans is introduced into the main inner space. It is not necessary based on the outside air valve to prepare the main inner space for a fire with the use of separate fresh air to be provided by separate tanks, so that such fresh air to be provided separately must be used in case of a fire only.

Another advantageous embodiment of the fire escape chamber according to the present invention is characterized in that the fire escape chamber has a gas sensor on an outer side of an outer side wall element, and that the control unit is configured to actuate the outside air valve as a function of a sensor signal of the gas sensor. Due to the control unit actuating the outside air valve as a function of the sensor signal, closing of the outside air valve can be performed in an automated manner in case of a fire.

Another advantageous embodiment of the fire escape chamber according to the present invention is characterized in that the main inner space has a connection device for at least one fresh air tank, and that the control unit is configured to control or regulate a fresh air supply through the fresh air gas tank by means of the connection device as a function of the sensor signal. This makes it possible to use the fresh air supply provided by the fresh air gas tank automatically in case of fire. The use of fresh air from the fresh air gas tanks is minimized hereby in the case in which there is no fire, so that a larger amount of fresh air can be used from the fresh air gas tanks in case of fire.

Another advantageous embodiment of the fire escape chamber according to the present invention is characterized in that the main inner space is connected to the lock area via at least one first air valve, said first air valve making possible the outflow of air from the main inner space into the lock area only when a preset first pressure difference between the main inner space and the lock area is exceeded, and that the lock area is connected via at least one second air valve to an outside area, wherein the second air valve makes possible the outflow of air from the lock area into the outside area only when a preset second pressure difference between the lock area and the outside area is exceeded. This is advantageous, because air can flow out of the main inner space via the lock area towards the outside area only beginning from a certain minimum pressure within the inner space, so that an automatic purging of spent air is made possible from the main inner space via the lock and into the outer space.

The present invention will be explained in more detail below in a special embodiment without limitation of the general inventive idea on the basis of the figures.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
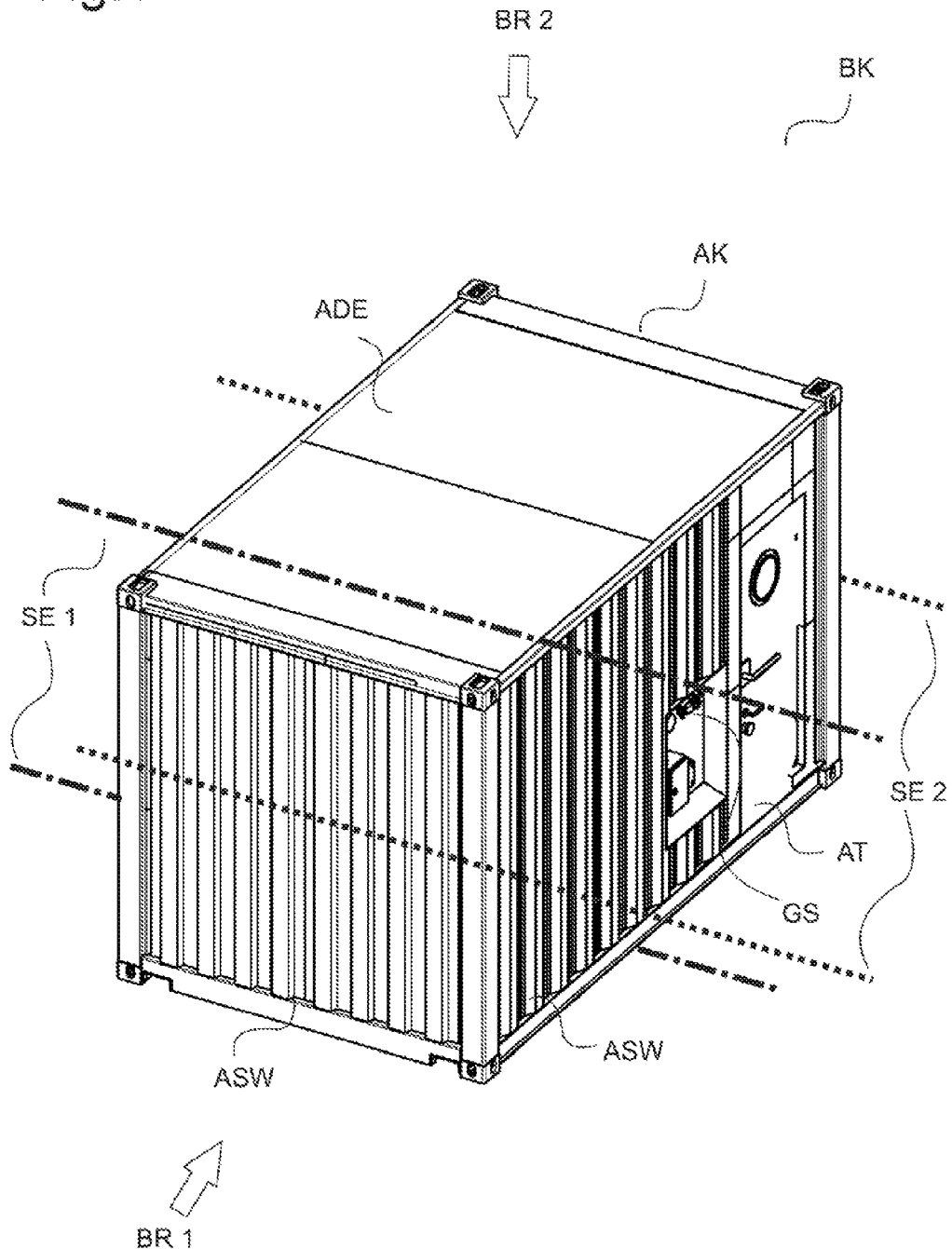
FIG. 1 is a perspective view showing a fire escape chamber according to the present invention.
Figure 7:
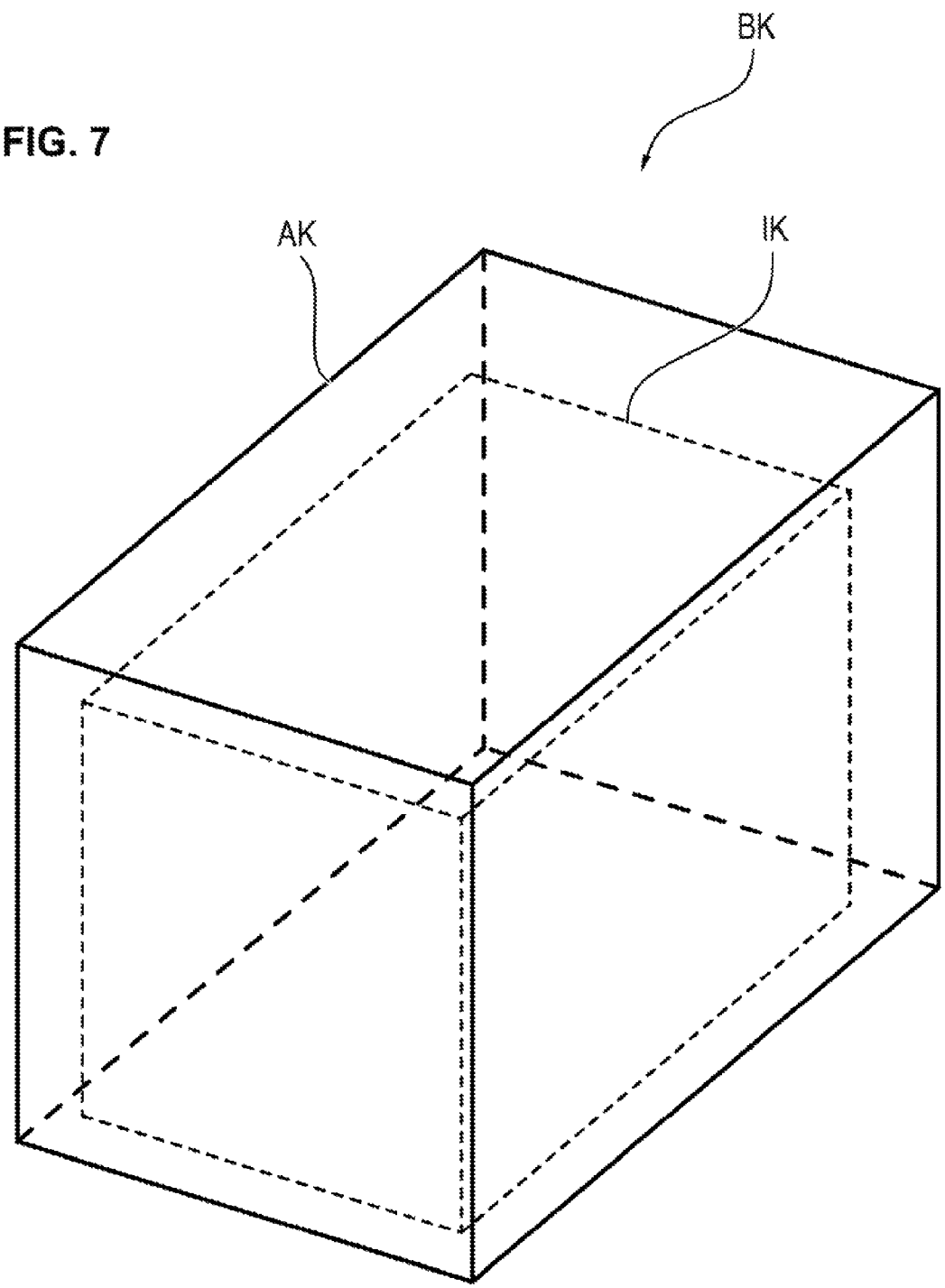
FIG. 7 is a schematic view showing an outer cage and an inner cage of the fire escape chamber according to the present invention.

Referring to the drawings, FIG. 1 shows the fire escape chamber BK according to the present invention. Corresponding to this, FIG. 7 shows an outer cage AK of the fire escape chamber as well as a hermetically sealable inner cage IK in their position in relation to one another.

Returning to FIG. 1, it should be noted that the outer cage AK is preferably configured as a container.

The outer cage AK has outer side wall elements ASW as well as at least one outer ceiling element ADE. Further, the outer cage AK has an outer ceiling element ADE, which will be shown explicitly later in FIG. 2.

An outer side wall element ASW preferably has an outer door AT, through which the fire escape chamber BK can be entered. Further, the fire escape chamber BK preferably has, at an outer side wall element ASW, a gas sensor GS, which will be explained in more detail below with reference to FIG. 5.

The outer cage AK is hermetically sealed when the outer door AT is closed.

Figure 2:
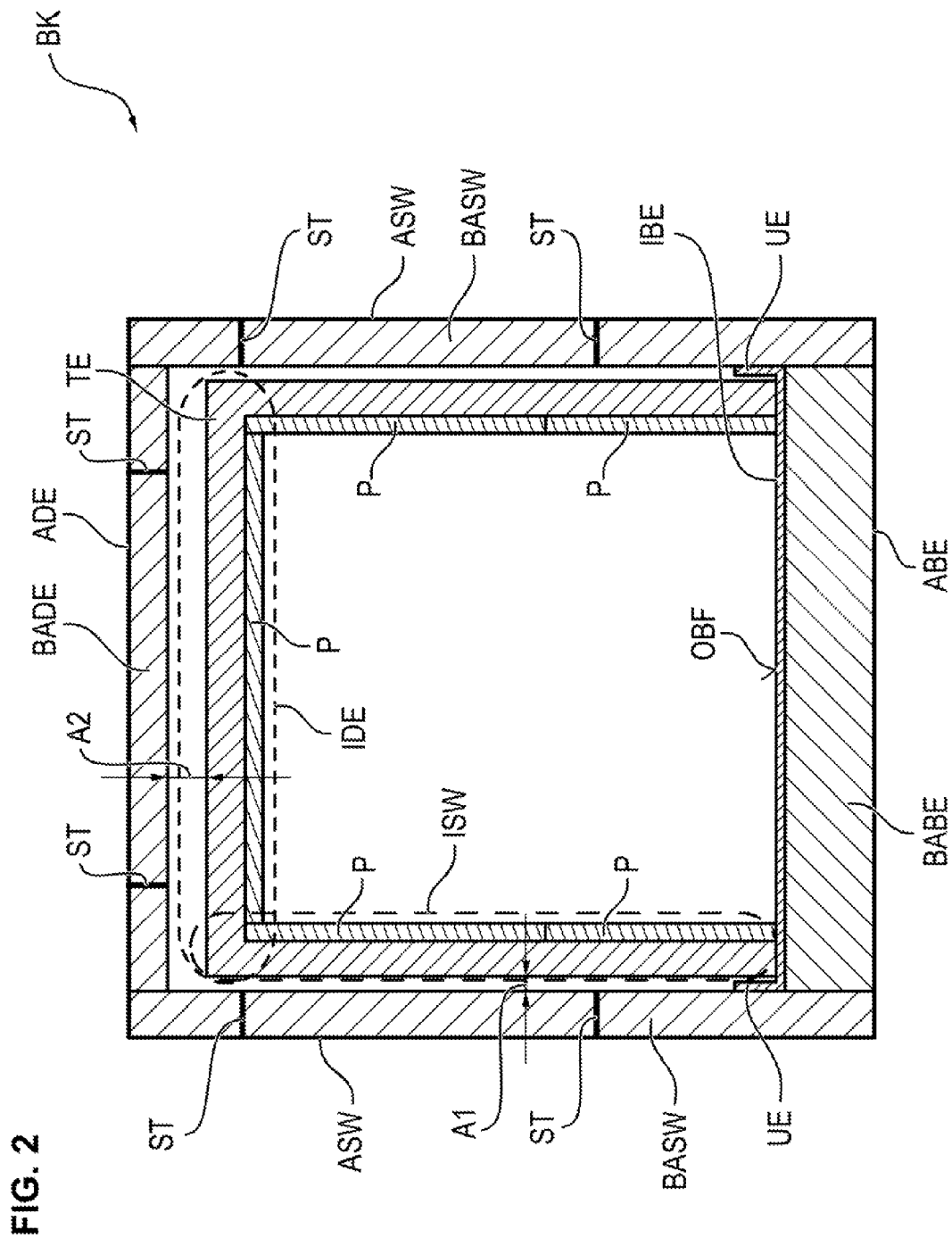
FIG. 2 is a cross sectional view taken through a vertically extending section plane in the direction of arrow BR1 of FIG. 1, showing the fire escape chamber according to the present invention.

FIG. 2 shows a lateral sectional view of the fire escape chamber BK in a perspective view shown in FIG. 1 in a direction of view BR1 in a section along a section plane, as it is indicated by the section line SE1. The section plane is a vertically extending section plane.

FIG. 2 shows the outer side wall elements ASW of this for the fire escape chamber BK, the outer ceiling element ADE as well as the outer floor element ABE of the outer cage. Respective fire protection insulation layers BABE, BASW, BADE are arranged on the respective inner sides of the outer elements ASW, ADE, ABE. The fire protection insulation layers BASW, BADE in the area of the outer side wall elements as well as of the outer ceiling element ADE are arranged by means of pin elements ST, which are mechanically connected to the outer side wall elements ASW as well as the outer ceiling element ADE. Such pin elements ST are usually used to fix such fire protection insulation layers BASW, BADE and represent a thermal coupling towards the outer side wall elements ASW and the outer ceiling element ADE. The pin elements ST protrude into the respective fire protection insulation layers BASW, BADE of the outer side walls ASW and of the outer ceiling element ADE from the outer side wall elements ASW and from the outer ceiling element ADE.

FIG. 2 shows, further, an inner side wall element ISW as well as an inner ceiling element IDE as well as an inner floor element IBE. The inner floor element IBE is mounted in a supporting manner on the fire protection insulation layer BABE of the outer floor element ABE. The inner cage of the fire escape chamber BK is carried as a result by the fire protection insulation layer BABE of the outer floor element ABE.

The inner side wall elements ISW and the inner ceiling element IDE are formed by means of a plurality of support structure elements TE, to the inner sides of which panels P are, in turn, fastened. The support structure elements are located at spaced locations from the pin elements, as it appears from a joint view of FIG. 2 and FIG. 3.

The inner floor element IBE has, at its outer edge area, a bordering element UE, which extends along the outer edge area at least in some segments and which is higher than the upper floor surface OBF of the inner floor element IBE and which is in contact with the fire protection insulation layers BASW of the outer side wall elements ASW.

The inner side wall elements ISW and the inner ceiling element IDE are located at spaced locations from the respective fire protection insulation layers BASW and BADE of the outer side wall elements ASW and of the outer ceiling element ADE. An inner side wall element ISW preferably has here a distance A1 from the adjacent fire protection insulation layer BASW. The distance A1 preferably equals at least 3 mm.

Further, the inner ceiling element IDE preferably has a distance A2 of at least 3 mm from the adjacent fire protection insulation layer BADE.

Figure 3:
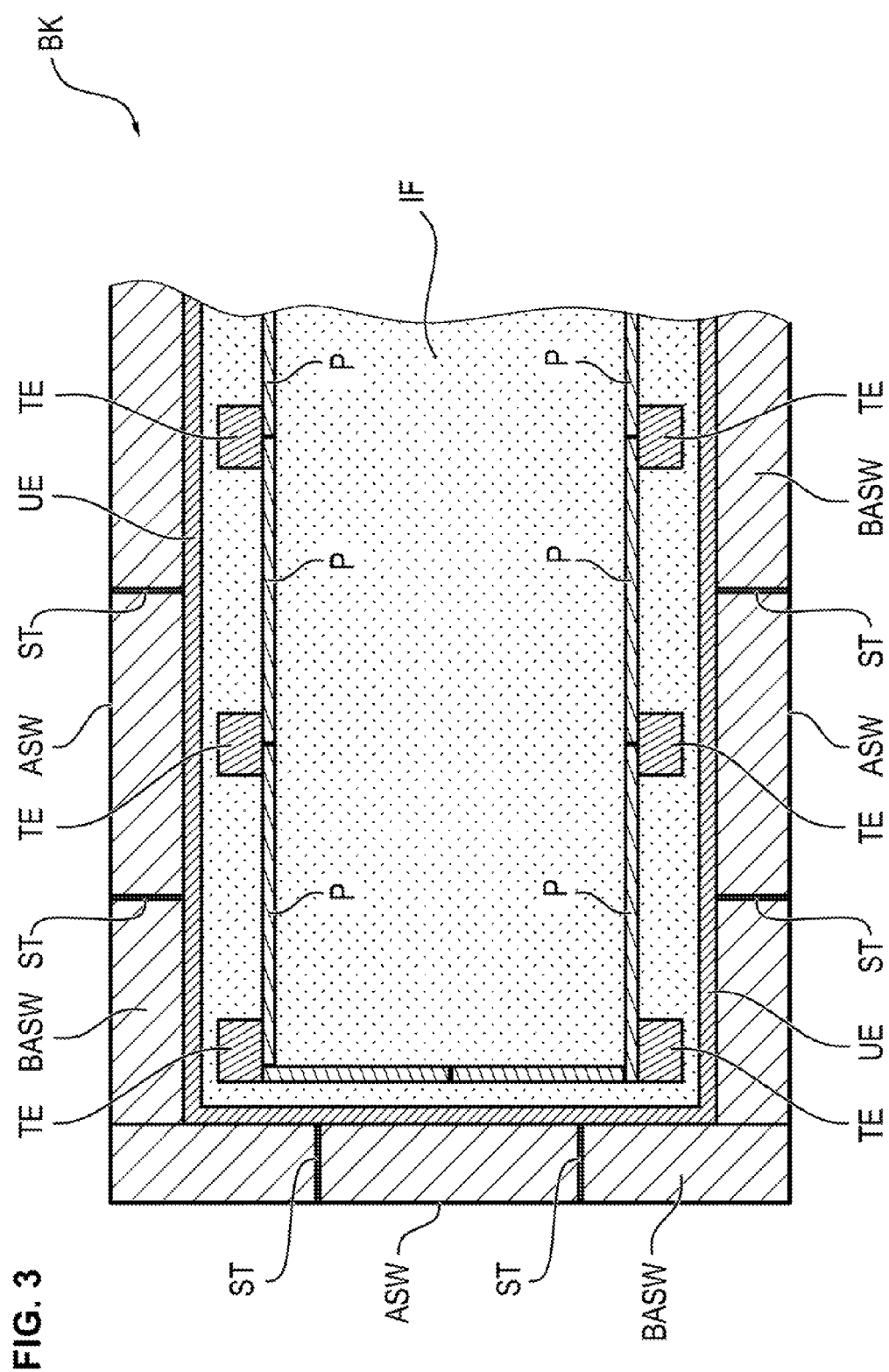
FIG. 3 is a cross sectional view taken from above through a horizontally extending section plane in the direction of arrow BR2 of FIG. 1, showing the fire escape chamber according to the present invention.

The support structure elements TE are fastened to the inner floor element IBE, see also FIG. 3. The support structure element TE shown is located within an inner surface of the inner floor element IDE, which is limited by the bordering element UE.

FIG. 3 shows, from a direction of view BR2 shown in FIG. 1, a sectional view of the fire escape chamber BK along a section plane in a horizontal place, as is indicated by the broken section lines SE2.

The inner surface IF or inside surface IF of the inner floor element can be clearly seen in FIG. 3, this inner surface IF being located within the bordering element UE. Further, the plurality of support structure elements TE can be seen in this top view of the fire escape chamber BK.

The inner side wall elements ISW as well as the inner ceiling element IDE from FIG. 2 are formed by means of these support structure elements TE. The support structure elements TE as parts of the inner side wall elements ISW as well as of the inner ceiling element IDE are preferably located at spaced locations from the respective fire protection insulation layers BASW and BADE of the outer side wall elements ASW and of the outer ceiling element ADE.

The support structure elements TE are preferably hollow sections, to which the panels P are fastened to form the inner side wall elements ISW as well as the inner ceiling elements IDE.

Figure 4A:
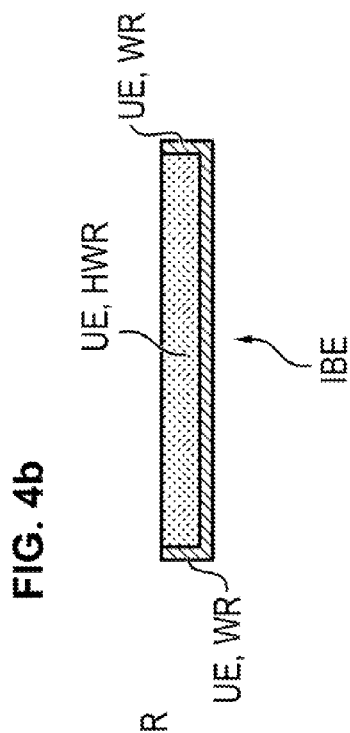
FIG. 4*a* is a top view showing an inner floor element according to a first embodiment.
Figure 4B:
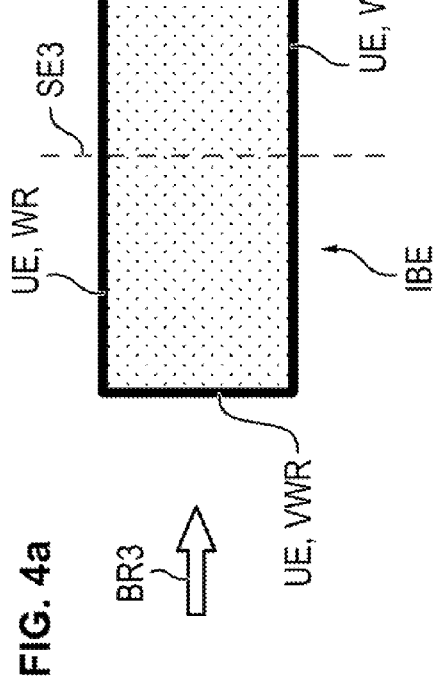
FIG. 4*b* is a cross sectional view of the inner floor element through section line SE3 in the direction of arrow BR3 of FIG. 4*a;*

FIG. 4a shows a top view from above of an inner floor element IBE according to a first embodiment. The inner floor element IBE has a tub configuration (a configuration with a tub shape), the bordering element UE having a tube edge WR in the lateral area, a front tub edge VWR in the area as well as a rear tub edge HWR in the rear area. FIG. 4b shows a corresponding side view for the direction of view BR3 shown in FIG. 4a and for a section of the inner floor element IBE along the section plane indicated by the section line SE3. The tub edges WR can be seen on the left and right as bordering elements UE along with a top view of the rear tub edge HWR.

Figure 4C:
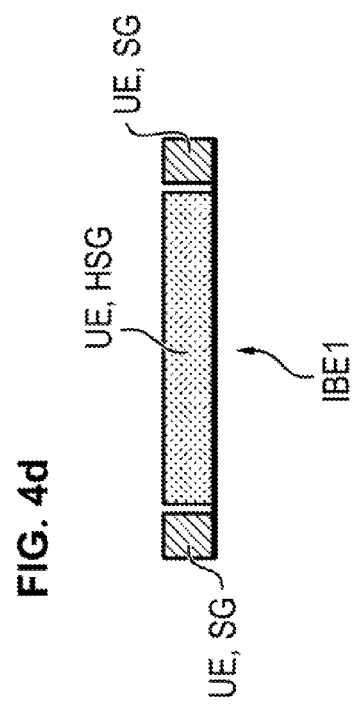
FIG. 4*c* is a top view showing an inner floor element according to a second embodiment.
Figure 4D:
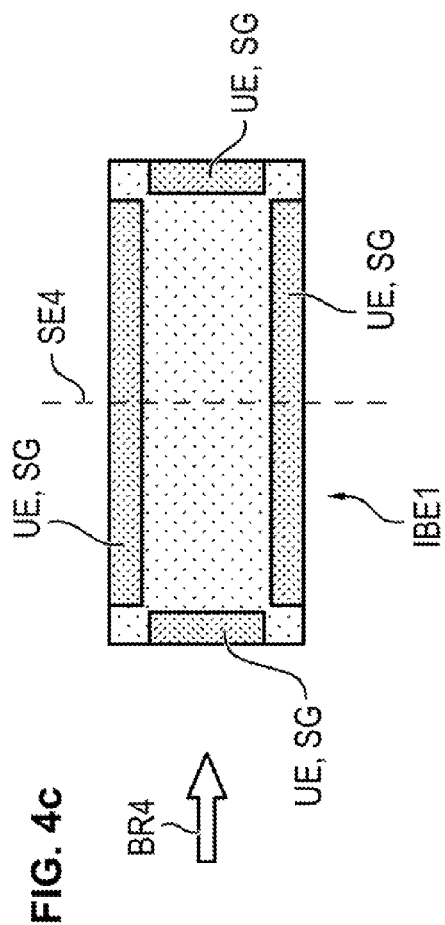
FIG. 4*d* is a cross sectional view of the inner floor element through section line SE4 in the direction of arrow BR4 of FIG. 4*c;*

FIGS. 4c and 4d show the inner floor element IBE1 according to a second exemplary embodiment. The inner floor element IBE1 has as bordering elements UE the web elements SG, HSG, which extend around the outer edge of the floor element IBE1 in at least some segments.

FIG. 4d shows a lateral sectional view of the floor element IBE1 for the direction of view BR4 shown in FIG. 4c and for sectioning along the section plane indicated by the section line SE4. The lateral web elements SG as well as a top view of a rear web element HSG, which is also shown in FIG. 4c, can be seen.

Figure 5:
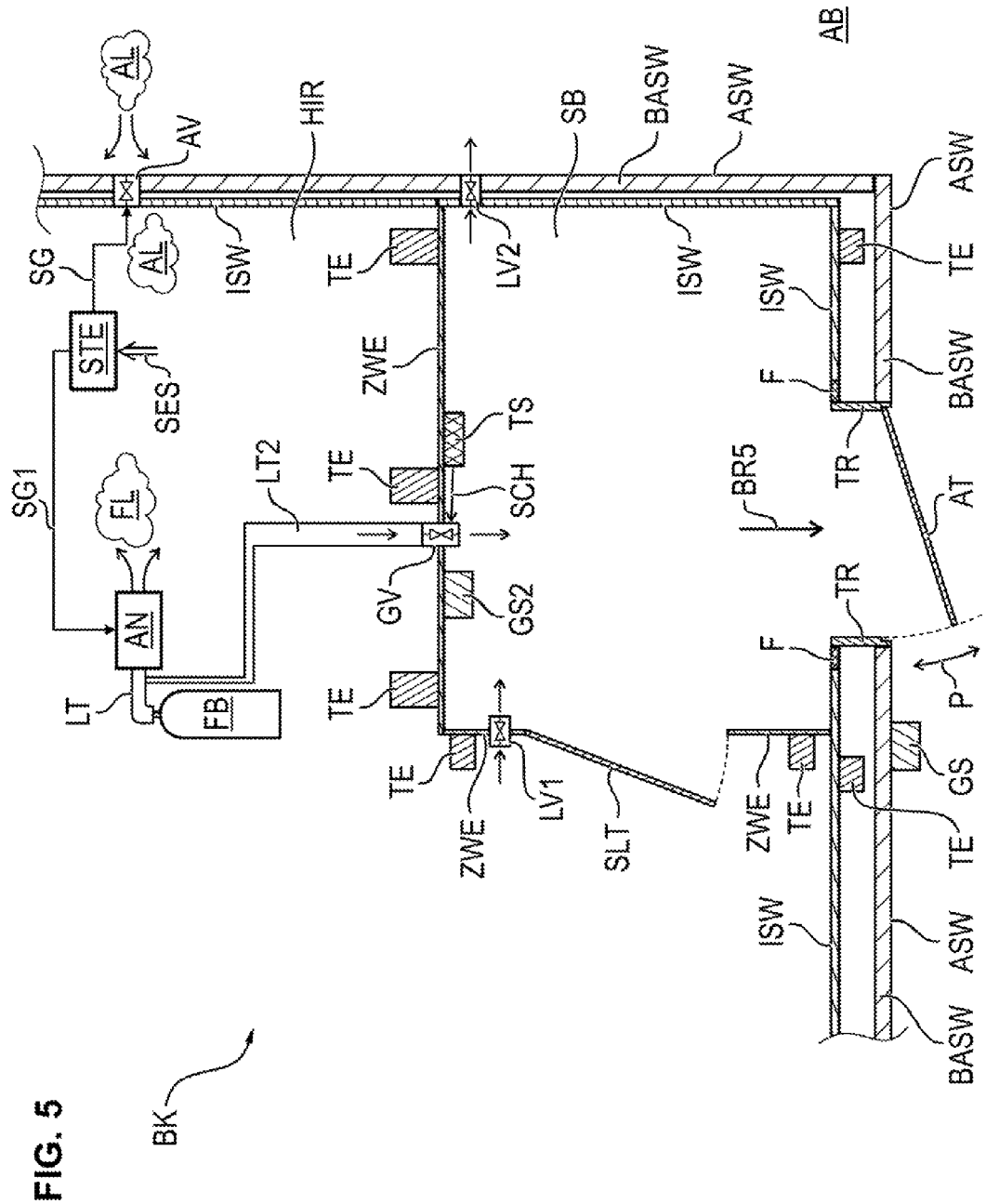
FIG. 5 is a cross sectional view showing a lock area and a main inner space of the fire escape chamber according to the present invention.

FIG. 5 shows a sectional view of an area of the fire escape chamber BK from the direction of view BR2 shown in FIG. 1 when sectioning through the fire escape chamber BK along a section plane as is indicated by the broken section lines SE2. This area of the fire escape chamber is located in the area of the outer door AT, through which the fire escape chamber BK can be entered.

An outer side wall element ASW has a door frame TR. This door frame TR protrudes from the outer side wall element ASW into the inner area of the fire escape chamber BK. The door frame TR is consequently formed from the outer side wall element ASW towards an inner side wall element ISW. The door frame TR is mechanically connected to the inner side wall element ISW via a joint F extending around the door frame TR and is sealed by it. The joint F consists of a heat-insulating material, which is preferably silicone.

Figure 6:
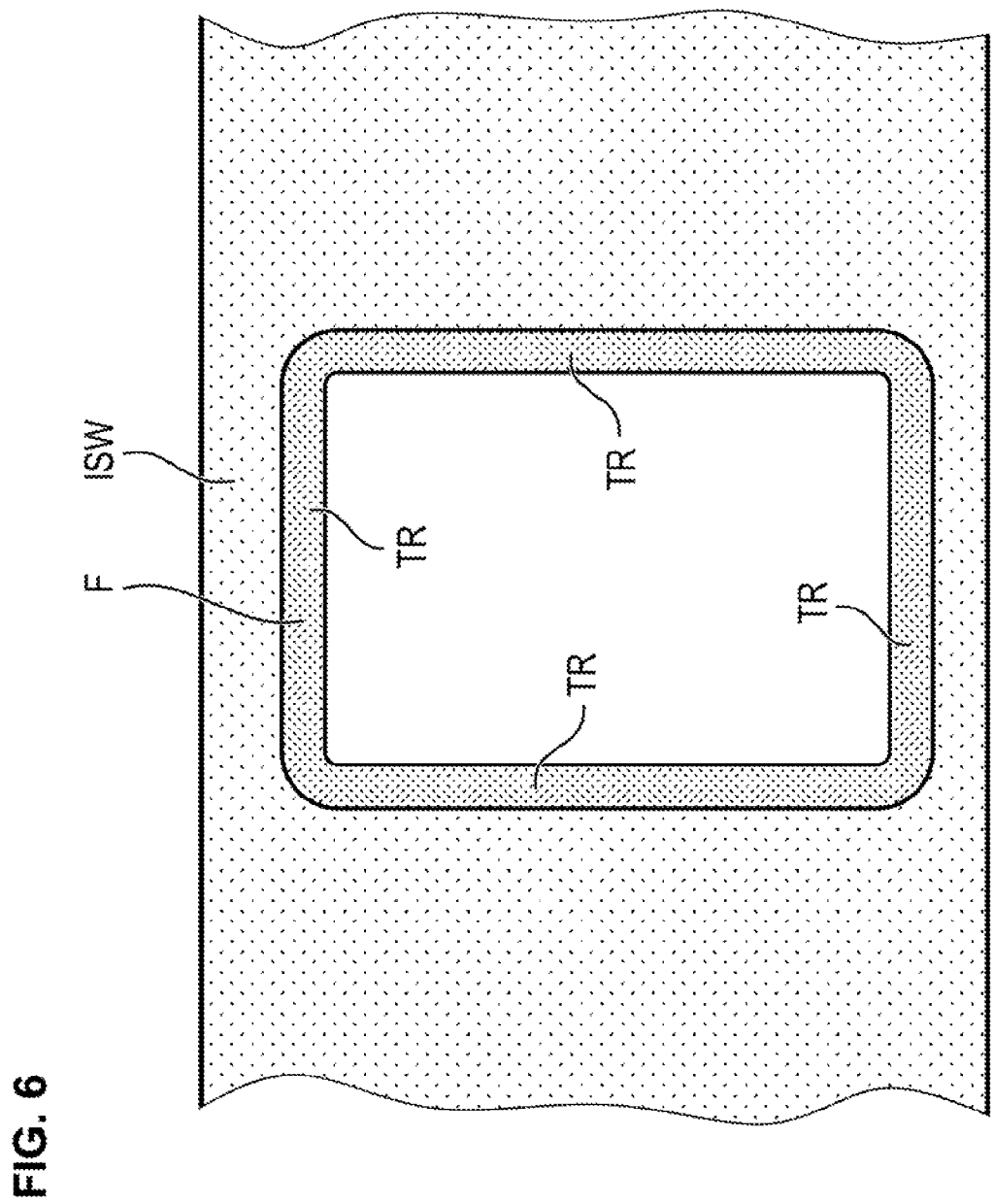
FIG. 6 is a side view showing a connection of a door frame of an outer door to an inner side wall element.

In a view from an inner area of the fire escape chamber BK, FIG. 6 shows for this a view of the door frame TR with a connection of the door frame TR to the inner side wall element ISW via the joint F.

According to FIG. 5, the inner cage of the fire escape chamber BK has a lock area SB, which adjoins the inner side wall element ISW and which can be hermetically separated by partition elements ZWE and by at least one additional lock door SLT from a main inner space HIR of the inner cage. The partition elements ZWE are preferably formed by means of panels arranged on additional support structure elements TE. These support structure elements TE for forming the partition elements ZWE preferably extend from the inner ceiling element to the inner floor element.

The main inner space has an outside air valve AV, via which the main inner space HIR is connected to an outside area AB. The outside air valve AV can be used to introduce outside air AL from the outside area AB into the main inner space HIR. This makes it possible to put the main inner space HIR under a so-called admission pressure, in case there is no fire. Consequently, no separately provided fresh air needs to be used for this from fresh air tanks FB, but the outside air AL can be used as a breathing air that can be used for escaping persons. The main inner space HIR has, further, a control unit STE, wherein the outside air valve AV controls the inflow of outside air AL into the main inner space HIR as a function of a control signal SG2 of the control unit STE.

On an outside of an outer side wall element ASW, the fire escape chamber BK has a gas sensor GS, which sends a sensor signal SES to the control unit STE. The sensor signal SES can preferably be sent via a wired connection between the gas sensor GS and the control unit STE, and this wired connection is not explicitly shown here in FIG. 5. The gas sensor is preferably a gas sensor that detects the presence of methane. Methane is a combustion gas, so that the gas sensor as a methane sensor provides reliable information on the presence of a combustion gas for the control unit STE. The control unit STE is configured to actuate the outside air valve AV as a function of the sensor signal SES of the gas sensor GS.

The main inner space HIR has a connection device AN for connection to one or more fresh air tanks FB. The connection device AN is preferably connected to a fresh air tank FB via a line LT as well as possibly existing threads or valves. The control unit STE is preferably configured to control or regulate a fresh air supply FL through the fresh air tank by means of the connection device AN as a function of the sensor signal SES with the use of a control signal SG1.

The main inner space HIR is connected to the lock area SB via at least one air valve LV1. The air valve LV1 makes possible the outflow of air from the main inner space HIR into the lock area SB when a preset first pressure difference between the main inner space HIR and the lock area SB is exceeded. It is ensured hereby that air will be discharged from the main inner space HIR into the lock area only when a minimum pressure, which is preset by the valve LV1, is exceeded.

Further, the lock area SB is connected via a second air valve LV2 to an outside area AB, and the air valve LV2 makes possible the outflow of air from the lock area SB into the outside area AB only when a preset second pressure difference between the lock area SB and the outside area AB is exceeded. This second pressure difference is preset by the properties of the valve LV2.

It is consequently ensured by the valves LV1 and LV2 that no combustion gas can enter the lock areas SB through the valve LV2 from the outside area AB and that, further, no entrained gases, which are present in the lock area SB, can enter the main inner space HIR through the valve LV1.

The fire escape chamber BK has, further, at least one gas sensor GS2 in the lock area SB. This gas sensor GS2 is configured to measure and to display concentrations of gases, for example, hydrogen sulfide and/or carbon monoxide.

Further, the lock area SB has a gas valve GV, which is connected to a fresh air tank FB or to the fresh air tank FB, said valve being preferably connected via a line LT2. The valve GV makes possible the inflow of fresh air provided by the fresh air tank FB into the lock area SB. The valve GV can be controlled by a switch TS, which is preferably a dead man switch.

The configuration of the fire escape chamber BK shown in FIG. 5 makes it possible to enter the main inner space as part of the inner cage via the lock area SB in an especially safe manner.

An escaping person can open the door AT as an outer door and enter the lock area SB. After closing the outer door AT, it is possible for the escaping person, with the lock door SLT closed, to first read the gas concentration valves provided by the gas sensor GS2. If a displayed gas concentration valve exceeds a preset valve, which is preferably preset by an emergency plan posted in the area of the lock area, the switch TS permits the escaping person to purge the lock area SB with air by actuating the switch TS, the valve LV2 allowing contaminated air to be discharged from the lock area SB into the outside area AB. If a measured gas concentration valve at the gas sensor GS2 is then below the preset value, the escaping person is able to release the switch TS, and the valve GV is automatically blocked thereby in the preferred case of a dead man switch. The lock door SLT can then be opened and the escaping person can enter the main inner space HIR from the lock area SB without causing needless contamination of the breathing air within the main inner space HIR because of entrained gas from the lock area SB.

While specific embodiments of the invention have been shown and described in detail to illustrate the application of the principles of the invention, it will be understood that the invention may be embodied otherwise without departing from such principles.

APPENDIX

List of Reference Characters:

| | |
|---|---|
| A1, A2 | Distance |
| AB | Outside area |
| ABE | Floor element |
| ADE | Outer ceiling element |
| AK | Outer cage |
| AL | Outside air |
| AN | Connection device |
| ASW | Outer side wall elements |
| AT | Outer door |
| AV | Outside air valve |
| BABE, BASW, BADE | Fire protection insulation layers |
| BK | Fire escape chamber |
| BR1 | Direction of view |
| BR2 | Direction of view |
| BR3 | Direction of view |

APPENDIX-continued

List of Reference Characters:

| | |
|---|---|
| BR4 | Direction of view |
| F | Joint |
| FB | Fresh air tanks |
| FL | Fresh air supply |
| GS | Gas sensor |
| GS, GS2 | Gas sensor |
| GV | Gas valve |
| HIR | Main inner space |
| HSE | Web element |
| HWR | Rear tub edge |
| IBE, IBE1 | Inner floor element |
| IDE | Inner ceiling element |
| IF | Inner surface |
| IK | Inner cage |
| ISW | Inner side wall element |
| LT, LT2 | Line |
| LV1, LV2 | Air valve |
| OBF | Upper floor surface |
| P | Panels |
| SB | Lock area |
| SE1 | Section lines |
| SE2 | Section lines |
| SE3 | Section lines |
| SE4 | Section lines |
| SES | Sensor signal |
| SG1, SG2 | Control signal |
| SG, HSG | Web elements |
| ST | Pin elements |
| SLT | Lock door |
| STE | Control unit |
| TE | Support structure elements |
| TR | Door frame |
| TS | Switch |
| UE | Bordering element |
| VWR | Front tub edge |
| WR | Tub edge |
| ZWE | Partition elements |

What is claimed is:

1. A fire escape chamber comprising:
a hermetically sealable outer cage comprising: outer side wall elements; at least one outer floor element; at least one outer ceiling element; an outer side wall element fire protection insulation layer on an inner side of the outer side wall elements; an outer floor element fire protection insulation layer on an inner side of the outer floor element; a ceiling element fire protection insulation layer on an inner side of the ceiling element; and pin elements, wherein some of the pin elements protrude into and fasten the outer side wall element fire protection insulation layer from the outer side wall elements and some of the pin elements protrude into and fasten the outer ceiling element fire protection insulation layer from the outer ceiling element; and
an inner cage comprising: inner side wall elements; at least one inner ceiling element; at least one inner floor element, wherein the inner floor element is mounted in a supporting manner on the outer floor element fire protection insulation layer, wherein the inner side wall elements and the inner ceiling element are formed by a plurality of support structure elements with inner sides and panels fastened on the inner sides of the support structure elements and the support structure elements are located at spaced locations from the pin elements, wherein the inner floor element has an outer edge with a bordering element, which extends around the outer edge in at least some segments and which is higher than the upper floor surface of the inner floor element and which is in contact with the fire protection insulation layers of the outer side walls, wherein the inner side wall elements are located at spaced locations from the respective outer side wall elements fire protection insulation layers and the and the inner ceiling element is located at a spaced location from of the outer ceiling element fire protection insulation layer.

2. A fire escape chamber in accordance with claim 1, wherein:
some of the support structure elements are fastened to the inner floor element and are located within an inner surface of the inner floor element limited by the bordering element;
some of the support structure elements are located at spaced locations from the respective outer side wall elements fire protection insulation layers; and
some of the support structure elements are located at spaced locations from the outer ceiling element fire protection insulation layer.

3. A fire escape chamber in accordance with claim 1, wherein the support structure elements are hollow sections.

4. A fire escape chamber in accordance with claim 1, wherein the inner floor element has a tub configuration and the bordering element forms an edge of the tub configuration.

5. A fire escape chamber in accordance with claim 1, wherein one of the outer side wall elements has a door frame for an outer door and the door frame is formed from one outer side wall element towards one of the inner side wall elements and a heat seal joint extending around the door frame and connecting the door frame to said one of the outer side wall elements, the heat seal joint being formed from a heat-insulating material.

6. A fire escape chamber in accordance with claim 5, further comprising an additional lock door and partition elements wherein the inner cage has a lock area, which adjoins said one inner side wall element and the lock area is hermetically separated from a main inner space of the inner cage by the partition elements and by the additional lock door.

7. A fire escape chamber in accordance with claim 6, wherein the main inner space has an outside air valve and a control unit, wherein the outside air valve controls an inflow of outside air into the main inner space as a function of a control signal of the control unit.

8. A fire escape chamber in accordance with claim 7, further comprising a gas sensor on an outer side of one of the outer side wall elements, and that the control unit is configured to actuate the outside air valve as a function of a sensor signal of the gas sensor.

9. A fire escape chamber in accordance with claim 8, wherein the main inner space has a connection device for at least one fresh air tank, and that the control unit is configured to control or to regulate a fresh air supply through the fresh air gas tank via the connection device as a function of the sensor signal.

10. A fire escape chamber in accordance with claim 7, wherein:
the main inner space is connected to the lock area via at least one first air valve, wherein the first air valve makes possible the outflow of air from the main inner space into the lock area only when a preset first pressure difference between the main inner space and the lock area is exceeded; and
the lock area is connected to an outside area via at least one second air valve, wherein the second air valve makes possible the outflow of air from the lock area into the outside area only when a preset second pressure difference between the lock area and the outside area is exceeded.

11. A fire escape chamber in accordance with claim 1, wherein the inner cage comprises an interior space for receiving personnel during an emergency situation.

12. A fire escape chamber comprising:
a hermetically sealable outer cage comprising: outer side wall elements; at least one outer floor element; at least one outer ceiling element; an outer side wall element fire protection insulation layer on an inner side of the outer side wall elements; an outer floor element fire protection insulation layer on an inner side of the outer floor element; a ceiling element fire protection insulation layer on an inner side of the ceiling element; and pin elements, wherein some of the pin elements protrude into and fasten the outer side wall element fire protection insulation layer from the outer side wall elements and some of the pin elements protrude into and fasten the outer ceiling element fire protection insulation layer from the outer ceiling element; and
an inner cage comprising: inner side wall elements; at least one inner ceiling element; at least one inner floor element, wherein the inner floor element is mounted in a supporting manner on the outer floor element fire protection insulation layer, wherein the inner side wall elements and the inner ceiling element are formed by a plurality of support structure elements with inner sides and panels fastened on the inner sides of the support structure elements and the support structure elements are located at spaced locations from the pin elements, wherein one of the outer side wall elements has a door frame for an outer door and the door frame is formed from one outer side wall element towards one of the inner side wall elements and a heat seal joint extending around the door frame and connecting the door frame to said one of the outer side wall elements, the heat seal joint being formed from a heat-insulating material.

13. A fire escape chamber comprising:
a hermetically sealable outer cage comprising: outer side wall elements; at least one outer floor element; at least one outer ceiling element; an outer side wall element fire protection insulation layer on an inner side of the outer side wall elements; an outer floor element fire protection insulation layer on an inner side of the outer floor element; a ceiling element fire protection insulation layer on an inner side of the ceiling element; and pin elements, wherein some of the pin elements protrude into and fasten the outer side wall element fire protection insulation layer from the outer side wall elements and some of the pin elements protrude into and fasten the outer ceiling element fire protection insulation layer from the outer ceiling element; and
an inner cage comprising: inner side wall elements; at least one inner ceiling element; at least one inner floor element, wherein the inner floor element is mounted in a supporting manner on the outer floor element fire protection insulation layer, wherein the inner side wall elements and the inner ceiling element are formed by a plurality of support structure elements with inner sides and panels fastened on the inner sides of the support structure elements and the support structure elements are located at spaced locations from the pin elements, the pin elements being thermally disconnected from the inner side wall elements, wherein the inner cage defines an inner protective space for protecting personnel during an emergency situation.

14. A fire escape chamber in accordance with claim 13, wherein the inner floor element has an outer edge with a bordering element, which extends around the outer edge in at least some segments and which is higher than the upper floor surface of the inner floor element and which is in contact with the fire protection insulation layers of the outer side walls, wherein the inner side wall elements are located at spaced locations from the respective outer side wall elements fire protection insulation layers and the and the inner ceiling element is located at a spaced location from of the outer ceiling element fire protection insulation layer.

15. A fire escape chamber in accordance with claim 13, wherein the support structure elements are hollow sections.

16. A fire escape chamber in accordance with claim 13, wherein one of the outer side wall elements has a door frame for an outer door and the door frame is formed from one outer side wall element towards one of the inner side wall elements and a heat seal joint extending around the door frame and connecting the door frame to said one of the outer side wall elements, the heat seal joint being formed from a heat-insulating material.

17. A fire escape chamber in accordance with claim 13, wherein each of the support structure elements has a support structure element outer surface, the outer side wall element fire protection insulation layer comprising a side wall insulation layer inner surface, the ceiling element fire protection insulation layer comprising a ceiling insulation layer inner surface, the side wall insulation layer inner surface, the ceiling insulation layer inner surface and the support structure element outer surface of each of the support structure elements defining at a least a portion of a space.

18. A fire escape chamber in accordance with claim 17, wherein the support structure elements are located at a spaced location from the ceiling element fire protection insulation layer and the outer side wall element fire protection insulation layer.

19. A fire escape chamber in accordance with claim 13, further comprising fasteners, the panels being connected to the support structure elements via the fasteners, wherein the fasteners are located at spaced location from the outer side wall element fire protection insulation layer and the outer wall elements.

20. A fire escape chamber comprising:
a hermetically sealable outer cage comprising: outer side wall elements; at least one outer floor element; at least one outer ceiling element; an outer side wall element fire protection insulation layer on an inner side of the outer side wall elements; an outer floor element fire protection insulation layer on an inner side of the outer floor element; a ceiling element fire protection insulation layer on an inner side of the ceiling element; and pin elements, wherein some of the pin elements protrude into and fasten the outer side wall element fire protection insulation layer from the outer side wall elements and some of the pin elements protrude into and fasten the outer ceiling element fire protection insulation layer from the outer ceiling element; and
an inner cage comprising: inner side wall elements; at least one inner ceiling element; at least one inner floor element, wherein the inner floor element is mounted in a supporting manner on the outer floor element fire protection insulation layer, wherein the inner side wall elements and the inner ceiling element are formed by a plurality of support structure elements with inner sides and panels fastened on the inner sides of the support structure elements and the support structure elements are located at spaced locations from the pin elements, wherein the support structure elements are hollow sections.

* * * * *